United States Patent [19]

Takahashi

[11] Patent Number: 4,830,433
[45] Date of Patent: May 16, 1989

[54] RECLINING SEAT FOR MOTOR VEHICLE

[75] Inventor: Fugio Takahashi, Ayase, Japan

[73] Assignee: Ikeda Bussan Co., Ltd., Ayase, Japan

[21] Appl. No.: 135,259

[22] Filed: Dec. 21, 1987

[30] Foreign Application Priority Data

Jan. 28, 1987 [JP] Japan .................. 62-11294[U]

[51] Int. Cl.⁴ .............................................. B60N 1/02
[52] U.S. Cl. ................................... 297/378; 297/367; 297/355
[58] Field of Search ............... 297/355, 378, 379, 367, 297/368, 369, 112, 125, 219; 5/43

[56] References Cited

U.S. PATENT DOCUMENTS

| | | | |
|---|---|---|---|
| 2,042,886 | 6/1936 | Ferguson | 297/378 X |
| 3,008,765 | 11/1961 | Tischler et al. | 297/367 |
| 3,034,829 | 5/1962 | Flint | 297/378 |
| 3,226,157 | 12/1965 | Reinfeldt et al. | 297/378 X |
| 3,736,026 | 5/1973 | Ziegler et al. | 5/43 |
| 4,286,819 | 9/1981 | Inoue et al. | 297/379 |
| 4,384,743 | 5/1983 | Barley | 297/355 |
| 4,496,189 | 1/1985 | Tanizaki et al. | 297/112 |
| 4,699,426 | 10/1987 | Tagawa | 297/378 |
| 4,709,964 | 12/1987 | Seura | 297/219 |

FOREIGN PATENT DOCUMENTS 61-167848 10/1986 Japan .

Primary Examiner—Francis K. Zugel
Attorney, Agent, or Firm—Foley & Lardner, Schwartz, Jeffery, Schwaab, Mack, Blumenthal & Evans

[57] ABSTRACT

Herein disclosed is a reclining seat which has a compactly constructed reclining device which comprises a base member secured to a seat cushion, an arm pivotally connected to the base member and extending into a given chamber formed in the seatback and secured to the same, a latching mechanism disposed in the given chamber and arranged between the base member and the arm in a manner to selectively achieve locked engagement therebetween, an operation handle mounted to the seatback and linked the latching mechanism to actuate the same, and a cover member covering an entrance part of the given chamber. The cover member is tightly fixed to a part of the latching mechanism and has a slit which receives a raised part of the base member when the seatback is inclined in a given direction relative to the seat cushion.

11 Claims, 2 Drawing Sheets ial FIG.
RECLINING SEAT FOR MOTOR VEHICLE

BACKGROUND OF THE INVENTION

1. Field of the Invention

The present invention relates in general to seats, and more particularly to seats of a reclining type wherein a seatback is inclinable to a desired angular locked position relative to a seat cushion.

2. Description of the Prior Art

Hitherto, various kinds of reclining seats have been proposed and put into practical use particularly in the field of passenger motor vehicles. However, some of them have suffered from the drawback that when the seatback is inclined to a certain angular position, unsightly parts of a reclining device become viewable from the outside through a relatively larg opening which appears between the seat cushion and the seatback. This phenomenon lowers the external appearance of the seat. Furthermore, some of the prior are reclining seats are formed bulky in construction, so that it sometimes occurs that a rigid part of the reclining device makes unconformatable, hard contact for a seat occupant sitting feeling.

SUMMARY OF THE INVENTION

It is therefore an object of the present invention to provide an improved reclining seat which is free of the above-mentioned drawbacks.

In accordance with the present invention, there is provided a reclining seat which comprises a seat cushion; a seatback; pivot means for allowing a pivotal movement of the seatback relative to the seat cushion; and a reclining device operatively arranged between the seat cushion and the seatback for allowing the seatback to assume a desired angular locked position relative to the seat cushion, the reclining device including: a base member secured to the seat cushion; means defining in the seatback a given chamber; an arm pivotally connected to the base member and extending into the given chamber to be secured to the seatback; a latching mechanism disposed in the given chamber and operatively arranged between the base member and the arm so as to selectively achieve a locked engagement therebetween; an operation handle mounted to the base member and linked to the latching mechanism to actuate the same; and a cover member covering an entrance part of the given chamber, the cover member being tightly fixed to a part of the latching mechanism and having a slit which receives a raised part of the base member when the seatback is inclined in a given direction relative to the seat cushion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
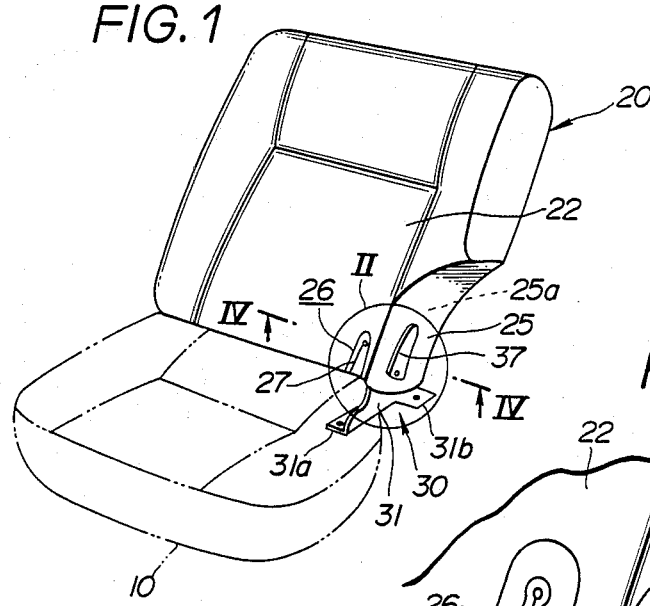
FIG. 1 is a perspective view of a reclining seat according to the present invention.

Referring to the attached drawings, particularly FIG. 1, there is shown a reclining seat according to the present invention, which comprises generally a seat cushion 10, a seatback 20 and a reclining device 30 which is interposed between the seat cushion 10 and the seatback 20 to adjust the angular position of the seatback 20 relative to the seat cushion 10.

Figure 3:
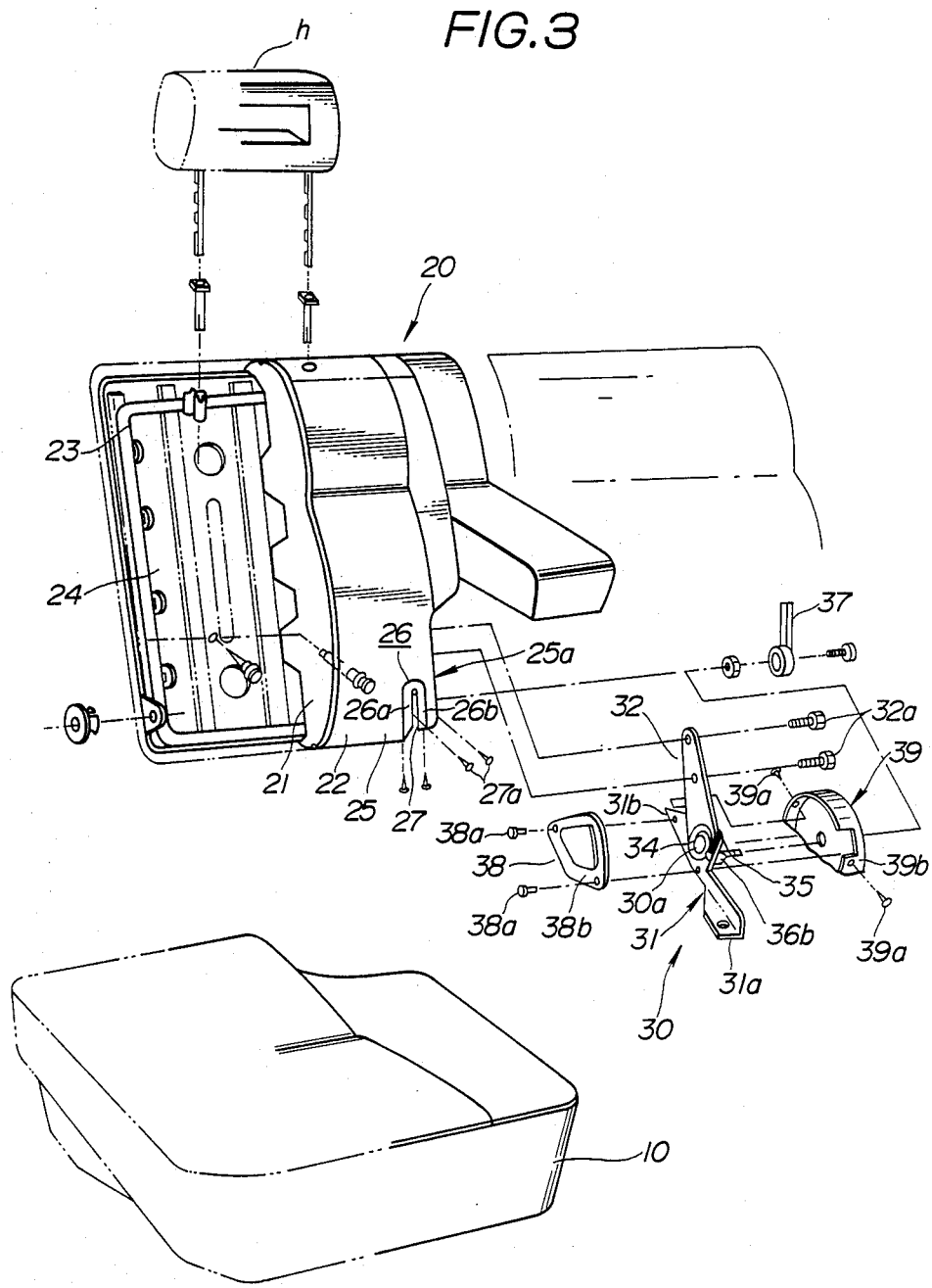
FIG. 3 is a partially cut exploded view of the reclining seat of the present invention.

As is seen from FIG. 3, the seatback 20 comprises a rectangular frame 23, a pan panel 24 held by the frame, and a pad 21 covered with an outer skin 22. Designated by reference "h" is a headrest which is detachably mounted on the seatback 20. The seat cushion 10 has substantially the same construction as the seatback 20.

As is understood from FIGS. 1 and 3, the reclining device 30 is arranged at one lateral side of the seat and comprises a base member 31 secured to the seat cushion 10, an arm 32 secured to the seatback 20 and pivotally connected to the base member 31 through a pivot pin 30a and a ratchet mechanism 35 which is disposed between and interconnected with the base member 31 and the arm 32 for achieving a latched engagement therebetween at a desired position of arm 32.

As will become apparent as the description proceeds, almost all parts of the reclining device 30 are housed in a chamber formed in a lower side portion 25 of the seatback 20. The arm 32 is placed in the chamber of the seatback 20 and secured to the frame 23 of the seatback 20 by means of bolts 32a and nuts. The base member 31 is an elongated member which has front and rear raised portions 31a and 31b as shown in FIG. 3.

Figure 2:
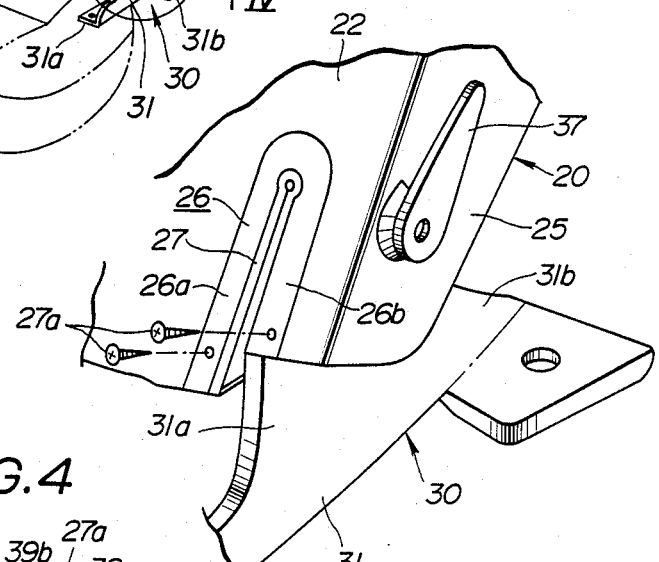
FIG. 2 is an enlarged view of a part enclosed by a circle II shown in FIG. 1.

As is seen from FIGS. 1 and 2, the outer skin 22 of the seatback 20 is formed at a portion facing the chamber with a slit 27 which is hemmed with a generally U-shaped reinforcing patch 26 having two leg portions 26a and 26b. During forward inclination of the seatback 20, the front raised portion 31a of the base member 31 is gradually inserted into the chamber through the slit 27.

Figure 4:
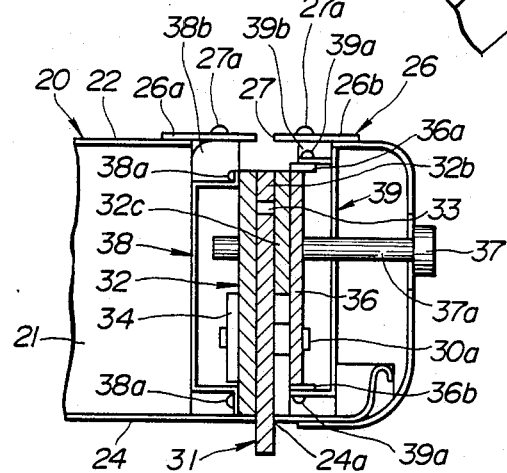
FIG. 4 is an enlarged sectional view taken along the line IV—IV of FIG. 1.

As is seen from FIG. 4, the pan panel 24 has a portion facing the slit 27 a cut 24a through which the rear raised portion 31b of the base member 31 is received into the chamber of the seatback 20 when the seatback 20 is raised.

A plate 36 is pivotally connected to the base member 31 through the common pivot pin 30a. As is seen from FIG. 4, the plate 36 is placed at the opposite side of the arm 32 with respect to the base member 31. Although not shown in the drawing, the arm 32 and the plate 36 are connected by a connector, so that these two members 32 and 36 pivot together about the pivot pin 30a with the base member 31 therebetween. Thus, the two members 32 and 36 and the seatback 20 pivot together about the pivot pin 30a. The base member 31 is formed with a toothed sector portion 33 which faces the slit 27. Pivotally disposed between the arm 32 and plate 36 which are combined is a pawl member 32b which is selectively engageable with the teeth of the toothed sector portion 33. The pawl member 32b is secured at its base portion 32c to a pivot shaft 37a which passes through the arm 32 and plate 36 which are combined. An end of the pivot shaft 37a is exposed to the outside of the side portion of the seatback 20 and connected to an operation handle 37. Although not shown in the drawings, a suitable spring is incorporated with the operation handle 37 to bias the same in a direction to cause latched engagement between the pawl member 32b and the toothed sector portion 33. The toothed sector portion 33 and the pawl member 32b constitute the afore-mentioned ratchet mechaanism 35.

Thus, it will be appreciated that manipulation of the handle 37 induces selectively engagement and disengagement between the toothed sector portion 33 and the pawl member 32b.

A spiral spring 34 is disposed between and operatively connected with the base member 31 and the arm 32 so as to bias the arm 32 forward, that is, in a direction to incline the seatback 20 forward relative to the seat cushion 10.

Two protection covers 38 and 39 are mounted to the combined structure of the arm 32 and plate 36 to move therewith. That is, the protection cover 38 is fixed at its peripheral flange portions to the arm 32 by means of fastening screws 38a, while the other protection cover 39 is fixed to flanged portions 36a and 36b of the plate 36 by means of fastening screws 39a. Thus, the arm 32, the plate 36, and the protection covers 38 and 39 are stationary with respect to the seatback 20. These protection covers 38 and 39 are respectively formed with front portions 38b and 39b which are spaced from each other and secured to the leg portions 26a and 26b of the aforementioned U-shaped reinforcing patch 26 by means of fastening screws 27a.

In the following, operation of the reclining seat of the invention will be described with reference to the drawings.

For ease, the description will be commenced with respect to an in-use condition of the seat. In this condition, the pawl member 32b is latchingly engaged with one or some of the teeth of the toothed sector portion 33, so that the seatback 20 is locked to the seat cushion 10, assuming a certain raised position.

When the operation handle 37 is manipulated or turned in a given direction, the pawl member 32b is disengaged from the teeth of the toothed sector portion 33 cancelling the latched engagement therebetween. Thus, when thereafter the seatback 20 is pushed backward by manipulating handle 37, the seatback 20 is also inclined rearward against the biasing force of the spring 34. While, when the seatback 20 is pushed forward, the seatback 20 is inclined forward with the aid of the biasing force of the spring 34. When, during these pivotal movements of the seatback 20, the manipulation of the handle 37 is ceased, the pawl member 32b is pivoted, by the spring (not shown) associated with the handle 37, into engagement with another tooth or teeth of the toothed sector portion 33, so that the seatback 20 is locked at a new angular position relative to the seat cushion 10.

As will be understood from FIGS. 2 and 4, upon forward inclination of the seatback 20, the front raised portion 31a of the base member 31 is neatly received into the chamber of the seatback 20 through the slit 27 of the U-shaped patch 26, while, upon rearward inclination of the seatback 20, the rear raised portion 31b of the base member 31 is neatly received into the chamber through the cut 24a of the pan panel 24.

Advantages of the present invention are as follows.

First, due to the unique arrangement of the reclining device 30, as described hereinabove, and the use of U-shaped reinforcing patch 26, the unsightly parts of the device 30 are not viewed from the outside of the seat.

Second, since the U-shaped reinforcing patch 26 is tightly connected to the protection covers 38 and 39, the seat occupant never accidentally touches the inner parts of the reclining device 30.

Third, snce the reclining device 30 is compactly installed in the seatback 20, the seat can provide a seat occupant with comforable sitting without making contact with some parts of the device 30.

What is claimed is:

1. A reclining seat comprising:
    a seat cushion;
    a seatback;
    a reclining device operatively connected with both said seat cushion and said seatback for allowing said seatback to assume a desired angular locked position relative to said seat cushion, said seatback having an outer skin, said reclining device comprising:
    means defining in said seatback a given chamber, said chamber having an entrance;
    a base member secured to said seat cushion at a position near said given chamber of the seatback;
    an arm receivable in said given chamber, said arm having one end secured to said seatback and the other end pivotally connected to said base member;
    latch means disposed in said given chamber and operatively connected with both said base member and said arm so as to be capable of selective locking engagement therebetween;
    handle means mounted to said seatback and operatively connected to said latch means to actuate the same;
    a cover member, having a slit therein, substantially covering said entrance of said given chamber adapted to conceal said arm and latch means in the chamber, means to connect said cover member and said latch means, said last mentioned means being stationary relative to movement of said seatback; said raised part of said base member being insertable into said given chamber through the slit in said cover member when said seatback is moved relative to said seat cushion.

2. A reclining seat as claimed in claim 1, in which said cover member is attached to an outer skin of said seatback having said slit mated with a slit formed in said outer skin.

3. A reclining seat as claimed in claim 2, in which said cover member is a generally U-shaped patch member.

4. A reclining seat as claimed in claim 1, in which said base member is an elongate member which has front and rear raised portions which are positioned at opposite sides of said base member.

5. A reclining seat as claimed in claim 4, in which said latching mechanism comprises:
    a toothed sector portion formed on said base member;
    a pawl member pivotally held by said arm and latchingly engageable with at least one of the teeth of said toothed sector portion, said pawl member being linked to said operation handle.

6. A reclining seat as claimed in claim 5, in which said latching mechanism further comprises a pivot shaft which is pivotally held by said arm and secured to said pawl member to move therewith, said pivot shaft being connected to said operation handle.

7. A reclining seat as claimed in claim 6, in which said latching mechanism further comprises a plate which is pivotally connected to said base member and also connected to said arm to pivot therewith relative to said base member.

8. A reclining seat as claimed in claim 7, in which said latching mechanism further comprises two protection covers which are respectively mounted to said arm and said plate from the outside to cover essential parts of said reclining device.

9. A reclining seat as claimed in claim 8, in which said cover member is secured at its inner surfaces to given portions of the protection covers.

10. A reclining seat as claimed in claim 1, further comprising a spring which is arranged between said base member and said arm to bias the arm in a given direction.

11. A reclining seat as claimed in claim 10, further comprising another spring which is incorporated with said operation handle to bias the same in a direction to cause the locked engagement between said base member and said arm.

* * * * *